United States Patent [19]
Barnum et al.

[11] 4,268,008
[45] May 19, 1981

[54] PUSH BUTTON FAUCET

[75] Inventors: Thomas G. Barnum, Fox Point; William A. Smart, Jr., Hartland, both of Wis.

[73] Assignee: Bradley Corporation, Menomonee Falls, Wis.

[21] Appl. No.: 86,764

[22] Filed: Oct. 22, 1979

[51] Int. Cl.³ .......................................... F16K 31/122
[52] U.S. Cl. ..................... 251/44; 251/121; 239/533.13
[58] Field of Search ................ 251/36, 37, 120, 41, 251/44, 45, 46, 48, 50, 121, 4, 359, 364, 33, 47; 239/533.13, 533.14, 546

[56] References Cited

U.S. PATENT DOCUMENTS

| | | | |
|---|---|---|---|
| 1,555,755 | 9/1925 | Pratt | 251/44 |
| 1,560,770 | 11/1925 | Everstram | 251/44 |
| 1,812,104 | 6/1931 | Mason | 251/359 |
| 2,464,917 | 3/1949 | Babson | 251/4 |
| 2,500,750 | 3/1950 | Halenza | 251/120 |
| 2,562,315 | 7/1951 | Kempton | 251/120 |
| 2,664,095 | 12/1953 | Magni | 251/4 |
| 3,719,328 | 3/1973 | Hindman | 239/546 |
| 4,088,297 | 5/1978 | Doyle et al. | 251/44 |
| 4,109,895 | 8/1978 | Smart, Jr. et al. | 251/44 |

FOREIGN PATENT DOCUMENTS

| | | | |
|---|---|---|---|
| 446225 | 11/1912 | France | 251/41 |
| 1116072 | 3/1956 | France | 251/41 |

Primary Examiner—Martin P. Schwadron
Assistant Examiner—G. L. Walton
Attorney, Agent, or Firm—Quarles & Brady

[57] ABSTRACT

An energy saving push button faucet for delivering a predetermined volume of water in a set period of time includes a control valve with a movable plunger having a front face and a rear face, the front face of the plunger is normally retained upon a valve seat shutting off flow through the valve in the faucet by supply line pressure on the rear face. The valve also includes a pilot valve which can be actuated by a push button to relieve the pressure on the rear face and permit supply line pressure on the front face to move the plunger off the seat and open the valve. The nose of the plunger is provided with an internal passage containing a flow control mechanism which reduces the effective diameter of the passage to control the volume of water delivered by the faucet. The valve also includes an adjustable timing mechanism which determines the timing cycle or length of time the valve remains open. When the valve is open, water flowing through the valve from the supply line to the faucet outlet passes through the flow control mechanism in the nose of the plunger. The jet action of the water passing through the flow control mechanism reduces the pressure on the front face of the plunger and places the pressure differential between the front face and the rear face across the seat. As a result, when a greater pressure is once again sensed by the rear face than that sensed by the front face of the plunger, the plunger will move to seat and positively shut off flow through the faucet.

6 Claims, 3 Drawing Figures

PUSH BUTTON FAUCET

This invention relates to faucets, and more particularly, to a push button faucet with a control valve which permits the faucet to deliver a predetermined volume of liquid in a set period of time.

BACKGROUND OF THE INVENTION

Push button faucets are utilized in a variety of applications, such as in public restrooms where it is desired to have faucets which can be easily activated and which will automatically and positively close after delivering a predetermined volume of water in a set period of time to avoid wasting water and energy. In many states legislation has been passed which sets limits on both the flow rate and the volume of water which can be delivered when a faucet in a public facility is activated. Much of such legislation is based on the ASHRAE (American Society of Heating, Refrigeration and Air Conditioning Engineers) Standard 90-75 which requires that the faucet deliver not more than 0.25 gallons of hot water at a rate not exceeding 0.5 gallons per minute of hot water each time it is activated.

Because of the limited volume of water delivered per activation of the faucet, most faucets in public restrooms are provided with sprayheads which contain small openings which break the outlet flow into multiple streams to insure ample wetting for washing hands. In such sprayhead designs the small openings in the sprayhead are susceptible to plugging from the formation of deposits of lime or other materials dissolved in the water.

The push button faucet of the present invention not only meets the requirements of energy saving legislation based on ASHRAE 90-75, but also includes an improved non-liming sprayhead.

SUMMARY OF THE INVENTION

The present invention relates to a push button faucet for delivering a predetermined volume of liquid within a set period of time. The faucet has a control valve with a movable plunger having a front face and a rear face, the front face of the plunger is normally retained upon a valve seat shutting off flow through the valve and the faucet by supply line pressure on the rear face. The valve also includes a pilot valve which can be actuated by a push button to relieve the pressure on the rear face of the plunger and permit supply line pressure on its front face to move the plunger off the seat and open the valve. The nose of the plunger is provided with an internal passage containing a flow control mechanism which reduces the effective diameter of the passage to control the volume of water delivered by the faucet. The valve also includes a timing mechanism which determines the timing cycle or length of time the valve remains open.

As the valve opens, water flowing through the valve from the supply line to the faucet outlet passes through the flow control mechanism in the nose of the plunger. The jet action of the water passing through the flow control mechanism as the valve is opening assists the moving of the plunger to a full open position.

In the closing of the valve, the flow control mechanism in conjunction with an O-ring seal about the nose of the plunger reduces the pressure on the front face of the plunger and places the pressure differential between the front face and the rear face across the valve seat. As a result, when the pilot valve is closed a greater pressure is once again sensed by the rear face than that sensed by the front face of the plunger, the plunger will move to seat and positively shut off the flow through the faucet.

In the preferred form, a spring is included to apply force against the rear face of the plunger, and to provide added assurance that the front face of the plunger will be positively seated against the valve seat. The spring stabilizes the timing cycle at low flow rates of water through the valve.

In the preferred form, the faucet also includes an anti-liming sprayhead connected to its outlet. The sprayhead has a toroidal or spherical pierced shell, and a pierced elastomeric diaphragm disposed within the shell. The diaphragm deflects as liquid flows through the sprayhead and relaxes to a flat condition when the liquid flow stops. The flexing of the diaphragm resists plugging of the spray holes by lime or other minerals dissolved in the water.

It is an object of the present invention to provide a push button faucet with a control valve which will deliver a predetermined amount of liquid within a set period of time and positively close even at low flow rates.

It is a further object of the invention to provide a push button faucet with an anti-liming sprayhead.

It is still further an object of the invention to provide a vandal-resistant push button faucet with an anti-liming sprayhead.

The foregoing and other objects and advantages of the invention will appear from the following description. In the description, reference is made to the accompanying drawings which form a part hereof, and in which there is shown by way of illustration and not of limitation the preferred embodiment of the invention. Such embodiment does not represent the full scope of the invention, and reference is made to the claims herein for interpreting the breadth of the invention.

BRIEF DESCRIPTION OF THE DRAWINGS

FIG. 3 is an enlarged detail view in section showing the timing mechanism for the faucet of the present invention.

DESCRIPTION OF THE PREFERRED EMBODIMENT

Figure 1:
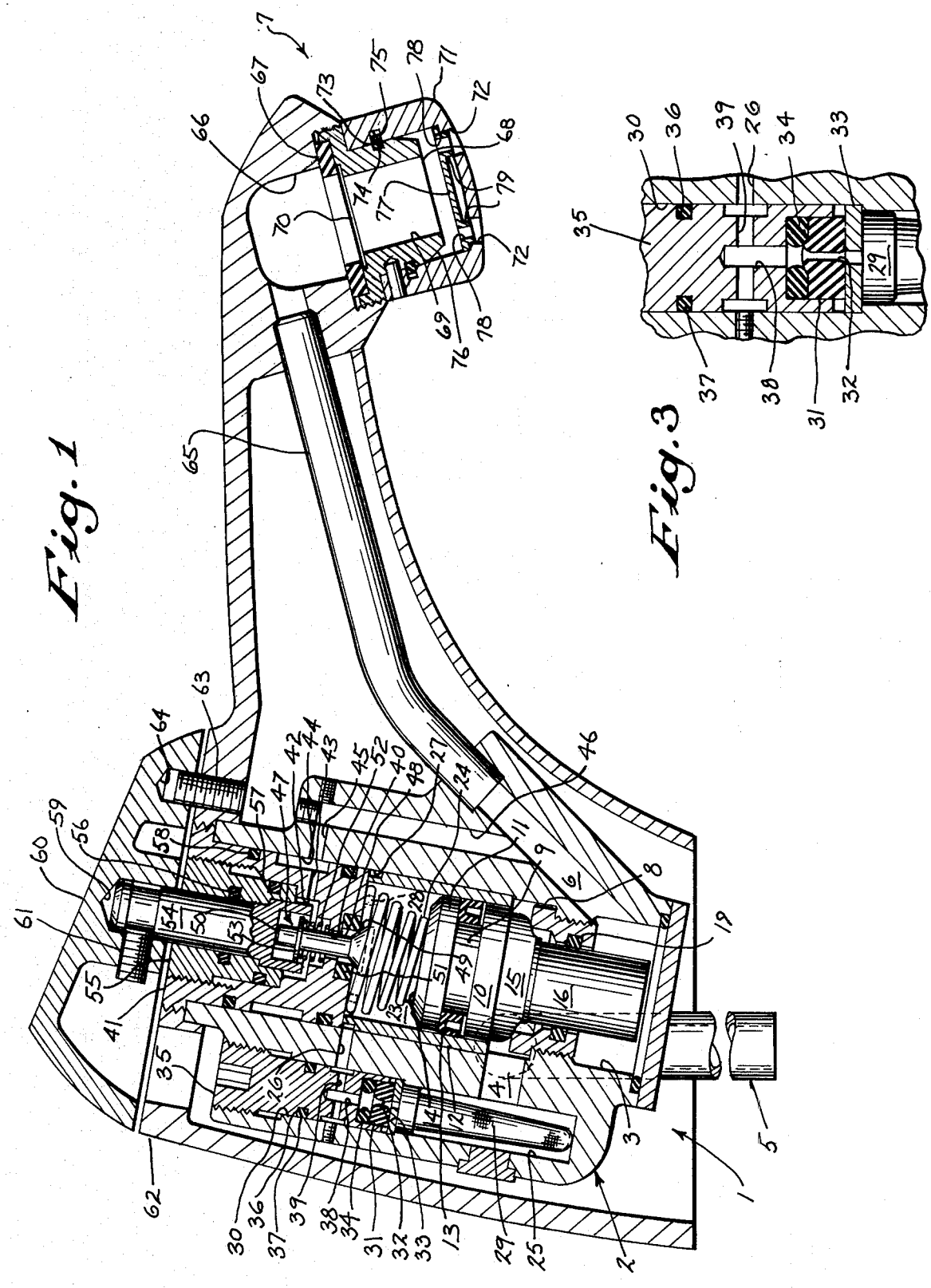
FIG. 1 is a sectional view in elevation with parts cut away of the faucet of the present invention in its closed position.

Referring to FIG. 1, there is shown a push button faucet according to the present invention. The faucet includes a control valve, designated generally by the numeral 1, having a valve body 2 with a longitudinal passage or bore 3 formed therein. The valve body 2 includes an inlet 4 connected by means of an inlet tube 5 to a water supply line, and an outlet 6 connected to a sprayhead assembly 7. Interposed between the inlet 4 and the outlet 6 is a valve seat 8 threadedly engaged in the longitudinal bore 3.

A plunger 9 is slidably movable within the longitudinal bore 3 to open and close the valve 1. The plunger 9 is guided for vertical movement within the longitudinal bore 3 by means of a pair of radial flanges 10 and 11 which slide against a cylindrical sleeve 12. To prevent fluid from passing between the plunger 9 and the sleeve 12, a U-cup washer 13 is positioned between the two radial flanges 10 and 11 and about the main body of the plunger 9 to form a fluid-tight seal. The plunger 9 also includes a rear face 14 and a front face 15 with an elongated nose 16 projecting therefrom into the lower end of the longitudinal bore 3. When the valve 1 is closed as shown in FIG. 1, the front face 15 of the plunger 9 is seated upon the valve seat 8 to prevent the flow of water from the inlet 4 to the outlet 6. The front face 15 of the plunger 9 is preferably comprised of an elastomeric material such as rubber to assist in forming a fluid-tight seal.

Figure 2:
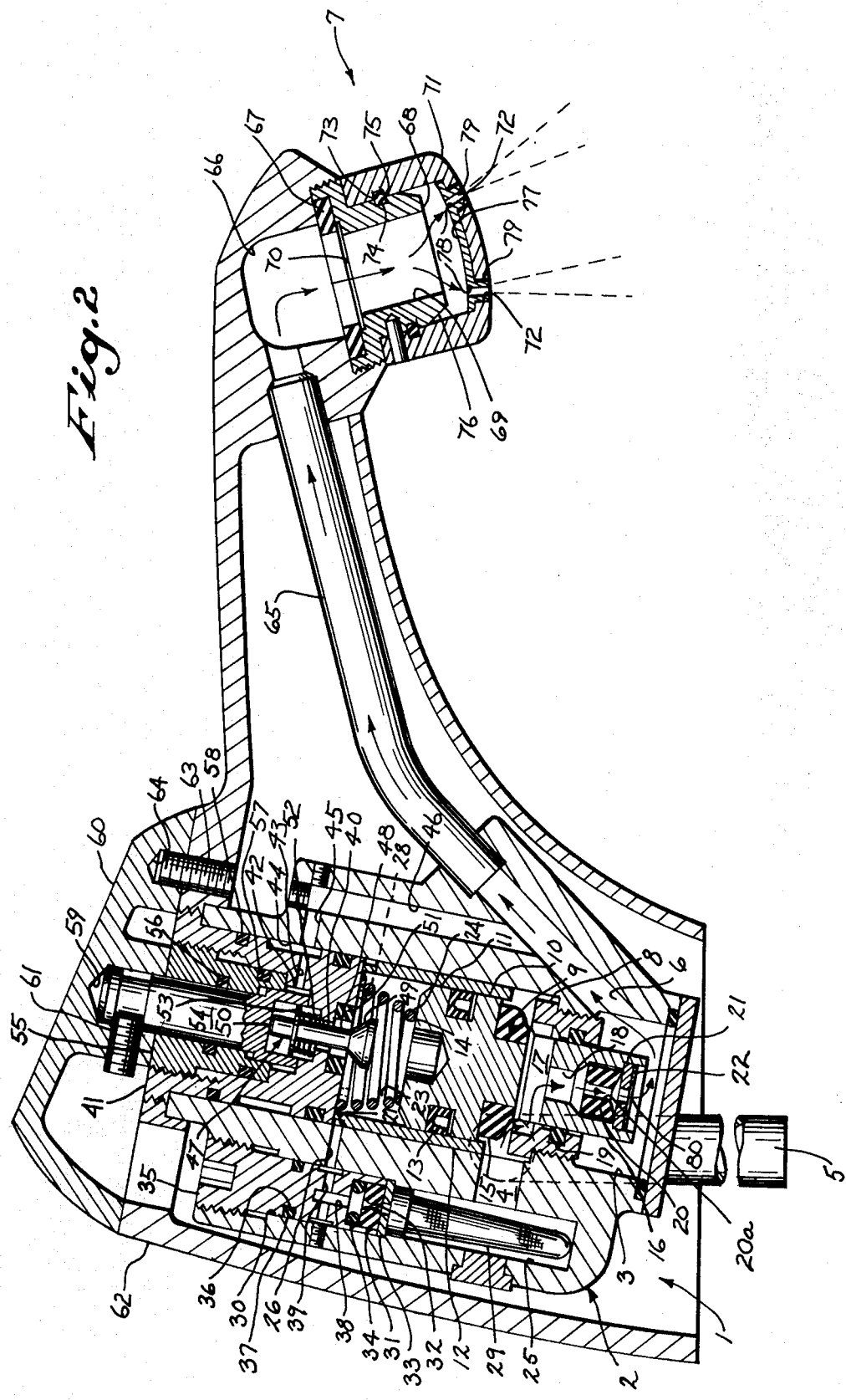
FIG. 2 is a sectional view in elevation with parts cut away of the faucet of the present invention in its partially open position.

As seen in FIG. 2, the nose 16 of the plunger 9 includes a radial opening 17 formed therethrough at its upper end, and an axial opening 18 formed therein which leads from the radial opening 17 to the lower end of the nose 16. When the control valve 1 is open as in FIG. 2, the radial opening 17 and axial opening 18 provide a passage through the nose 16 which permits water to pass from the inlet 4 to the outlet 6. An O-ring or gasket 19 is trapped in the valve seat 8 and cooperates with the nose 16 to form a fluid-tight seal which assures water flow through the radial opening 17 and axial opening 18 by preventing water from passing between the nose 16 of the plunger 9 and the valve seat 8.

Disposed within the axial opening 18 of the nose 16 of the plunger 9 is a flow control mechanism in the form of a restrictive orifice. The flow control mechanism includes an annular disc-like member 20 of elastomeric material which is seated within the axial opening 18 against an annular flow control seat 21 which is contained within the axial opening 18 by means of a retaining ring 22. The flow control mechanism has a control orifice 20a which reduces the effective diameter of the axial opening 18 creating a pressure differential across the valve seat 8 during normal water flow therethrough resulting in a reduced pressure acting on the front face 15 of the plunger 9 when the control valve 1 is open. The location of the flow control mechanism within the axial opening 18 assures complete travel for the plunger 9 due to the jet action of the water passing through the orifice 20a which places the pressure differential across the seat 8 as opposed to flow controls located on the inlet or outlet side of the valve 1 which reduce the pressure differential across the seat 8. This internal location also discourages tampering with the flow of the faucet so that it will continue to comply in use with the statutory requirements. The volume of water delivered by the faucet is determined by the size of the orifice 20a in the flow control mechanism and the timing cycle, that is, the length of time the valve remains open which is controlled by a timing mechanism which will be described.

Returning now to FIG. 1, it can be seen that when the valve 1 is closed, a pressure chamber 23 exists in the upper part of the longitudinal bore 3 which is filled with water. Supply line water pressure is transferred to the pressure chamber 23 by means of a bypass circuit which leads from the inlet 4 to the chamber 23 where it is sensed by the rear face 14 of the plunger 9 and is normally effective to maintain the front face 15 of the plunger 9 seated on the valve seat 8 so that the valve 1 remains closed. However, to assure complete travel of the plunger 9 against the valve seat 8 to positively seal off water flow, a conical spring 24 is disposed in the pressure chamber 23 behind the plunger 9 which applies a force on the rear face 14. The spring 24 stabilizes the timing cycle at low flow rates of water through the valve 1.

The bypass circuit by which the supply line water pressure is transferred to the pressure chamber 23 leads from the inlet 4 to a vertical passageway 25 which leads to a timing mechanism which in turn leads to a passage 26. The passage 26 communicates with a cylindrical chamber 27 formed in the upper edge of the sleeve 12. Four slots 28 (two of which are shown in FIGS. 1 and 2) lead from the cylindrical chamber 27 to the pressure chamber 23 to permit water from the inlet 4 to enter the chamber 23. The vertical passageway 25 is provided with a filter 229 and communicates with the passage 26 through a timing mechanism disposed within a timing mechanism bore 30.

As seen best in FIG. 3, the timing mechanism includes a disc 31 of deformable material having an axial opening 32 extending therethrough. The disc 31 rests upon the top of an annular washer 33, and a resilient O-ring 34, is supported upon the upper surface of the disc 31.

Returning now to FIG. 1, it can be seen that positioned above the O-ring 34 enclosing the open end of the timing mechanism bore 30 is a threaded timing adjustment screw 35 which is threadedly engaged in the upper portion of the bore 30. The timing adjustment screw 35 is provided with a circumferential groove 36 above the passage 26 in which an O-ring 37 is positioned to form a fluid-tight seal between the wall of the bore 30 and the timing adjustment screw 35. The O-ring 37 prevents leakage around the timing adjustment screw 35, and assures water flow into the passage 26. The timing adjustment screw 35 has an axial passageway 38 which is slightly larger than but is aligned with the axial opening 32 in the disc 31, and a radial passage 39 which leads from the axial passageway 38 to the passage 26 in the valve body 2 which in turn leads to the pressure chamber 23. The timing adjustment screw 35 may be turned down against the O-ring 34 to deform the disc 31. As seen in FIG. 3, the disc 31 is confined within the bore 30 and as it is deformed the diameter of the axial opening 32 is reduced in size from what it would be in its non-deformed state. The size of the opening 32 controls the rate of flow, and thereby the length of the timing cycle.

Returning now to FIG. 1, there is shown an opening 40 in an inner valve body 41 which is threadedly engaged in the top of the main valve body 2 which leads from the pressure chamber 23 to a valve stem chamber 42 which in turn leads by passageways 43 to a cylindrical chamber 44. The cylindrical chamber 44 communicates with the outlet 6 of the valve 1 by means of an opening 45 which leads to a vertical passageway 46 which in turn leads to the outlet 6. The opening 40 is normally closed by a pilot valve 47 which includes a poppet 48 having an enlarged head 49 and an elongated body 50. The underside of the head 49 is yieldably urged against a rubber pilot valve seat 51 surrounding the opening 40 in the pressure chamber 23 by a compression spring 52 to normally close the opening 40. The compression spring 52 is retained in the valve stem chamber 42 by retaining ring 53 which is positioned around the body 50 of the poppet 48. As seen in FIG. 1, the upper end of the body 50 of the poppet 48 engages the underside of a movable valve stem 54. The valve stem 54 is guided for vertical movement by means of a stem guide 55 threadably engaged in the upper portion of the inner valve body 41. The stem guide 55 is provided with a pair of circumferential grooves in which O-rings 56 and 57 are positioned to form fluid-tight seals between the wall of the valve stem 54 and the stem guide 55, as well as between the stem guide 55 and the inner valve body 41. The inner valve body 41 is also provided with an O-ring 58 which forms a fluid-tight seal between the wall of the main valve body 2 and the inner valve body 41.

As seen in FIG. 1, the upper end of the valve stem 54 extends above the top surface of the stem guide 55 and projects into a recess 59 in the underside of a push button 60. The push button 60 is secured to the valve stem 54 by means of a set screw 61, and is spaced from the top surface of the stem guide 55. In a preferred form, the push button 60 forms a part of a faucet housing 62 which surrounds the body 2 of the valve 1. A screw 63 in housing 62 engages an opening 64 in the underside of the button 60 to prevent rotation of the button 60. Additional screw (not shown) secure the housing 62 to the main body 2 of the valve 1.

Referring now to FIGS. 1 and 2, it can be seen that the outlet 6 of the valve 1 is connected by means of a curved supply tube 65 to an opening 66 in the outer end of the faucet housing 62. The opening 66 leads to the sprayhead assembly 7 which includes an annular rubber gasket 67 surrounding the opening 66 which is held in place by a cylindrical sprayhead core 68. The sprayhead core 68 has a longitudinal bore 69 formed therethrough, and is threadedly engaged with the outer end of the faucet housing 62. A screen 70 is sandwiched between the gasket 67 and upper end of the core 68. The screen 70 filters out foreign particles in the water as it passes through the sprayhead assembly 7.

The sprayhead assembly 7 includes a closed cylindrical sprayhead body 71 which surrounds the core 68. The lower end or face of the sprayhead body 71 is spherical in shape and pierced to form eight circumferentially arranged circular openings 72 (only two of which are shown in FIG. 1).

The sprayhead body 71 is secured to the core 68 by an elastomeric ring 73 disposed in a circumferential groove 74 formed in the core 68, and a complementary groove 75 formed in the body 71. The sprayhead body 71 is assembled to the core 68 by inserting the ring 73 into the groove 75 in body 71, and pushing the body 71 onto the core 68. The mouth of the core 68 is tapered as at 76 to permit the ring 73 to expand over the core 68 as the body 71 is pushed onto the core 68. When the ring 73 reaches the groove 74 in core 68, it snaps into the groove 74 and retains and seals the body 71 to the core 68. It should be noted that once assembled the sprayhead body 71 is free to swivel or rotate about the core 68 making the sprayhead assembly 7 vandal-resistant.

The sprayhead assembly 7 also includes an elastomeric diaphragm 77 located above the spherical face of the body 71. The diaphragm is pierced to form eight circumferentially arranged circular openings 78 (only two of which are shown in FIG. 1) which are aligned with the openings 72 in the face of the body 71. The diaphragm 77 also includes a pair of annular bosses 79 which extend downwardly from the lower surface of the diaphragm 77. The bosses 79 are located about a pair of oppositely disposed openings 78 in the diaphragm 77, and project into a pair of oppositely disposed openings 72 in the spherical face of the sprayhead body 71. The bosses 79 serve to align the openings 72 and 78, and prevent the diaphragm 77 from twisting or turning in the sprayhead body 71. The elastomeric characteristic of the diaphragm 77 allows the diaphragm 77 to deflect downwardly as shown in FIG. 2 against the face of the sprayhead body 71 as water flows through the sprayhead assembly 7. When the water stops flowing, the diaphragm 77 relaxes to its flat condition as shown in FIG. 1. This flexing of the diaphragm 77 resists plugging of the openings 72 and 78 by lime or other minerals dissolved in the water. The diaphragm 77 is preferrably molded of butyl rubber or neoprene. However, it may be formed of any material which possesses the desired properties of flexibility and durability.

As shown in FIG. 2, the openings 72 in the body 71 and the openings 78 in the diaphragm 77 permit eight individual streams of water to exit from the faucet. The individual streams of water diverge from the sprayhead assembly 7 due to the fact that the openings 72 are slightly tapered outwardly, and thus provide ample hand wetting even under low flow rate conditions.

Referring now to FIGS. 1 and 2, the operation of the push button faucet will now be described. When it is desired to open the control valve 1, the push button 60 is depressed such that the lower surface of the push button 60 is flush with the upper surface of the stem guide 55. Depressing the push button 60 moves the valve stem 54 downwardly against the elongated body 50 of the poppet 48 which in turn moves the underside of the poppet head 49 from its pilot valve seat 51 permitting water to leave the pressure chamber 23 by means of the opening 40. As the water leaves the chamber 23, the pressure upon the rear face 14 of the plunger 9 is relieved and the plunger 9 is moved upwardly in the bore 3 of the valve body 2 by supply line water pressure acting on the front face 15 of the plunger 9, and the jet action of the water passing through the flow control mechanism in the nose 16 of the plunger 9. As a result, the front face 15 of the plunger 9 leaves the valve seat 8 and the valve 1 is open, as shown in FIG. 2.

As the water leaves the presssure chamber 23 through the opening 40, it flows along the elongated body 50 of the poppet 48 into the valve stem chamber 42. The water then leaves the chamber 42 and enters the cylindrical chamber 44 through passageways 43, and travels through the opening 45 and vertical passageway 46 to the outlet 6.

As soon as the push button 60 is released, the poppet 48 assumes the position seen in FIG. 1 wherein the underside of the head 49 of the poppet 48 is seated against its seat 51 to close the opening 40. When the opening 40 is closed, the pressure chamber 23 begins to refill with water by means of the bypass circuit. The length of time required to fill the pressure chamber 23 and to once again close the valve 1 is controlled by the adjustment of the timing adjustment screw 35 and the resultant degree of deformation of the axial opening 32 in the disc 31.

Returning now to FIG. 2, it can be seen that while the pressure chamber 23 is refilling the main stream of water is travelling through the elongated nose 16 of the plunger 9 in the direction of the arrows 80. The water will travel through the radial opening 17 in the nose 16 and downwardly into the axial opening 18 in the nose 16. As the water travels downwardly through the axial opening 18 it passes through the orifice 20a in the annular disc-like member 20 in seat 21 of the flow control mechanism. The water then proceeds out the lower end of the nose 16 and through the outlet 6 to the sprayhead assembly 7.

The flow control mechanism not only controls the volume of water that passes through the valve 1, but also assures complete travel of the plunger 9 in the bore 3 when it is desired to open and close the valve 1. As the valve 1 opens the jet action of the water passing through the orifice 20a in the disc-like member 20 in the nose 16 provides an added reaction force which helps move the plunger 9 upwardly in the bore 3. As an aid to closing the valve 1, the orifice 20a reduces the effective diameter of the axial opening 18 in the nose 16 creating a pressure differential across the valve seat 8 during normal water flow therethrough. This results in a reduced pressure acting on the front face 15 of the plunger 9. Thus, when the pressure chamber 23 becomes refilled so that the rear face 14 of the plunger 9 once again senses supply line water pressure, the plunger 9 will move downwardly until its front face 15 seats itself upon the valve seat 8 due to the pressure differential sensed by the rear face 14 and front face 15.

The reduced pressure sensed by the front face 15 of the plunger 9 resulting from the jet action of the water passing through the flow control mechanism is especially useful in assuring the closing of the valve under low water flow rates of 1.0 gpm or less. It should also be noted that the conical spring 24 disposed in the pressure chamber 23 applies an additional force against the rear face 14 of the plunger 9 to assure positive seating of the front face 15 against its seat 8 under such low flow rate conditions.

In the push button faucet disclosed, the volume of water delivered each time the push button 60 is activated is determined by the size of the orifice 20a in the flow control mechanism and/or the timing cycle. Either of those two variables or both can be adjusted to meet specific needs.

It will be apparent to those skilled in the art that a number of changes and modifications can be made without departing from the spirit and scope of the present invention. For example, the various components can be changed in size or shape as long as the same function is required. Also, the control valve 1 and sprayhead assembly 7 disclosed herein are not limited to an installation for washing hands. They may also be used in other arrangements such as shower installations. Therefore, no limitations are to be placed upon the invention other than those set forth in the following claims.

We claim:

1. A faucet for delivering a predetermined volume of liquid in a set period of time comprises:
   a control valve for controlling the flow of liquid through the faucet includes a valve body having an inlet for connection to a liquid supply line and an outlet, and a bore extending therethrough;
   a valve seat disposed within said bore;
   a movable plunger having a front face and a rear face positioned in said bore, the front face of said plunger being normally seated upon the valve seat preventing the flow of water from said inlet to said outlet;
   a bypass circuit leading from the inlet through a timing mechanism to a pressure chamber behind the rear face of the plunger so that supply line pressure sensed by the rear face of the plunger maintains the valve in a closed position;
   manually actuatable pilot valve means for relieving the pressure in said pressure chamber so that the supply line pressure can move the front face of the plunger off the valve seat to open the valve;
   said plunger includes an elongated nose extending from its front face, said nose having an internal flow passage formed therethrough which permits liquid to flow from said inlet through said passage to said outlet when said valve is in its open position; and
   flow control means disposed in the passage in the plunger nose, said flow control means reduces the effective diameter of said passage to provide a jet action as liquid flows therethrough which creates a pressure differential across the valve seat and results in a reduced pressure that is less than supply line pressure to act on the front face of the plunger so that when the pilot valve has been actuated and supply line pressure has been relieved in the pressure chamber the control valve remains open until the pressure chamber is refilled by liquid flowing through the bypass circuit and the pressure sensed by the rear face of the plunger exceeds that on the front face whereupon the plunger moves to seat upon the valve seat and stop the flow of liquid through the faucet.

2. A faucet according to claim 1, wherein said passage in the plunger nose includes:
   an axial opening which leads to the outlet of said control valve, and
   a radial opening which leads from the axial opening to the inlet of said control valve.

3. A faucet according to claim 2, wherein said flow control means is located in the axial opening of said passage, and includes an annular disc-like member of elastomeric material which is seated within said axial opening.

4. A faucet according to claim 1, further including:
   spring means disposed in said pressure chamber applying a force against the rear face of said plunger to assure positive seating of the front face of said plunger upon the valve seat.

5. A faucet according to claim 1, wherein:
   said control valve outlet leads to a sprayhead assembly which includes a spherical pierced body, and a resilient, pierced, elastomeric diaphragm disposed within the body so that the diaphragm deflects as liquid flows through the sprayhead assembly and relaxes to a flat condition when liquid flow stops.

6. In a faucet for delivering a predetermined volume of liquid in a set period of time which includes a control valve for controlling the flow of liquid through the faucet having an inlet for connection to a liquid supply line and an outlet, a passage connecting the inlet and outlet; a valve seat disposed within said passage; a movable plunger having a front face and a rear face, the front face of said plunger being normally seated upon the valve seat to prevent the flow of water from said inlet to said outlet; a bypass circuit leading from the inlet to a pressure chamber behind the rear face of the plunger so that supply line pressure sensed by the rear face of the plunger maintains the valve in a closed position; manually actuatable pilot valve means for relieving the pressure in said pressure chamber so that supply line pressure on the front face of the plunger can move the plunger off the valve seat to open the valve; and a timing mechanism for determining how long the valve will remain open once the relief valve is actuated, the improvement which comprises:
   an elongated nose extending from the front face of the plunger, said nose having a passage formed therethrough which permits liquid to pass from said inlet to said outlet when said valve is in its open position, said passage including an axial opening which leads to the outlet of said control valve and a radial opening which leads from the axial opening to the inlet of said control valve; and flow control means disposed in the axial opening of the passage in the plunger nose, said flow control means includes an annular disc-like member of elastomeric material that effectively reduces the diameter of said passage to create a pressure differential across the valve seat during liquid flow therethrough which results in a reduced pressure that is less than supply line pressure acting on the front face of the plunger so that when the pilot valve means has been actuated and supply line pressure has been relieved on the rear face of the plunger the valve will remain open until the pressure sensed by the rear face of the plunger exceeds that on the front face whereupon the plunger moves to seat upon the valve seat and stop the flow of liquid through the faucet.

* * * * *